United States Patent [19]

Jones et al.

[11] 4,456,178
[45] Jun. 26, 1984

[54] EXHAUST NOZZLE ASSEMBLY WITH DUAL UNISON RING STRUCTURE

[75] Inventors: Dennis C. Jones, Stuart; James F. Marshall, Palm Beach Gardens, both of Fla.

[73] Assignee: United Technologies Corporation, Hartford, Conn.

[21] Appl. No.: 453,191

[22] Filed: Dec. 27, 1982

[51] Int. Cl.³ .............................................. B64C 15/06
[52] U.S. Cl. ............................................... 239/265.39
[58] Field of Search ........................ 239/265.39, 265.41

[56] References Cited

U.S. PATENT DOCUMENTS 2,972,226  2/1961  Geary .............................. 239/265.39

Primary Examiner—Andres Kashnikow
Assistant Examiner—Mary F. McCarthy
Attorney, Agent, or Firm—Stephen E. Revis

[57] ABSTRACT

A variable area exhaust nozzle has primary, axially movable flaps tied to an inner unison ring having a box-like cross section and axially movable external flaps tied to an outer unison ring of box-like cross section. The inner and outer rings are concentric, radially aligned, and separated by an engine case. The rings are interconnected by a plurality of pins extending radially from within the outer ring box section to within the inner ring box section through axially extending slots in the case between them. The pins are attached to the rings in a manner preventing relative axial movement therebetween and permitting relative radial movement. When one of the rings is actuated in an axial direction, the other moves axially therewith, the axial actuation force being transmitted by the interconnecting pins. The pins also resist the overturning moment on the rings caused by loads on the nozzle flaps.

5 Claims, 5 Drawing Figures

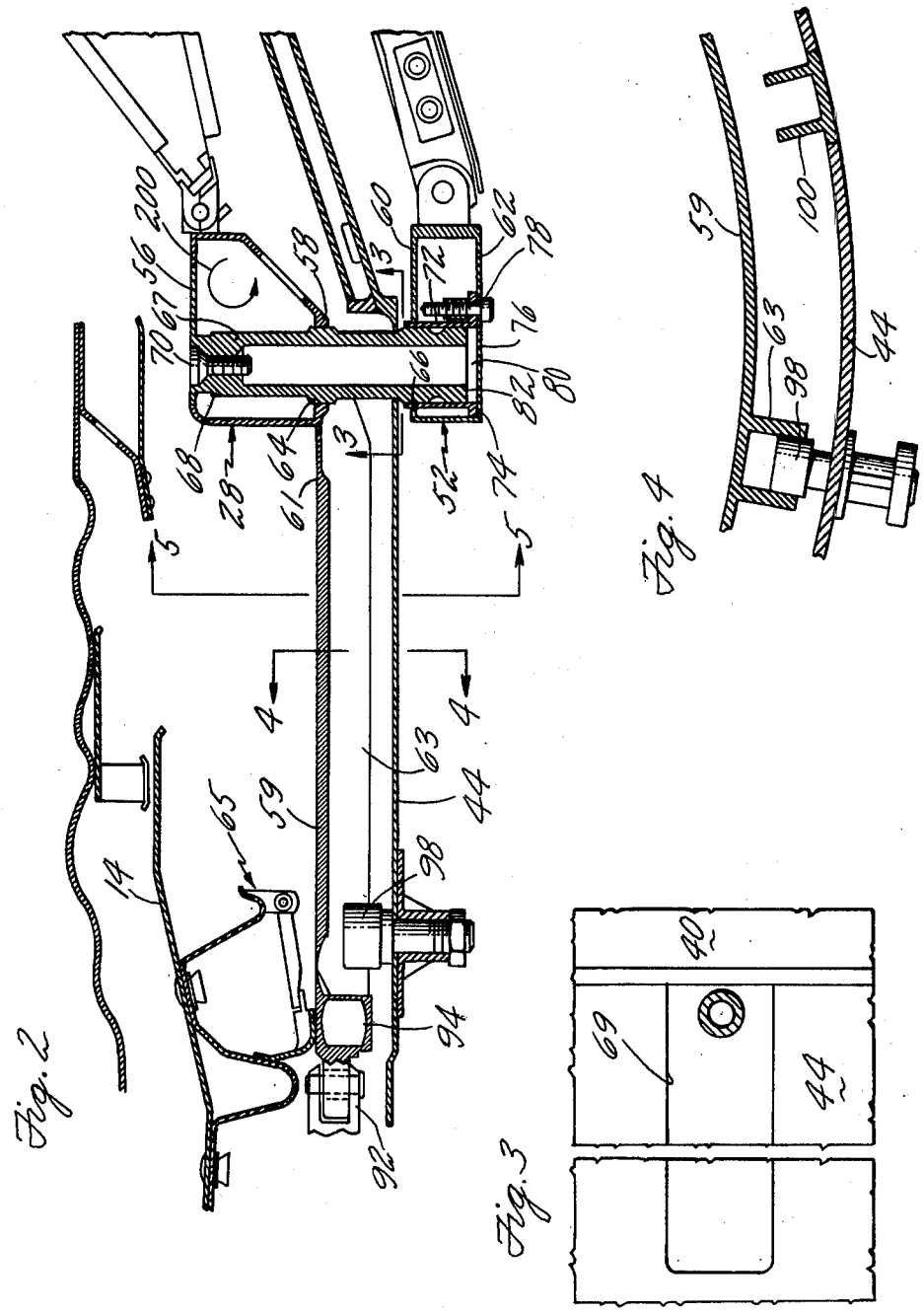

& # 35;

EXHAUST NOZZLE ASSEMBLY WITH DUAL UNISON RING STRUCTURE

DESCRIPTION

1. Technical Field

This invention relates to variable area exhaust nozzles for gas turbine engines, and more particularly to unison rings therefor.

b 2. Background Art

Convergent/divergent variable area three dimensional nozzles are well known in the art. Representative of such nozzles are U.S. Pat. Nos. 3,792,815; 4,141,501; 4,196,856; and 4,245,787. Each of these patents describes nozzles having convergent flaps, divergent flaps, and external nozzle flaps. Except for the '856 patent, in each case either the convergent or external flaps are pivotally connected to fixed engine structure. In the '856 patent the upstream ends of the external flaps are axially translatable independently of the motion of the convergent and divergent flaps by actuator means which operates independently from the actuation system which moves the convergent and divergent flaps. While this allows considerable freedom of motion, the requirement of a second actuation system is undesirable in view of its added weight, cost, and complexity.

Commonly owned pending U.S. patent application Ser. No. 334,490 by Walter H. Wiley titled "Axially Translatable Variable Area Convergent/Divergent Nozzle"0 filed on Dec. 28, 1981 and copending as of Jan. 20, 1984 shows an axisymmetric exhaust nozzle wherein convergent nozzle flaps are tied to an inner unison ring and external nozzle flaps are tied to an outer unison ring, wherein an engine case is disposed between the unison rings. In one embodiment structure is provided to tie the unison rings together such that a single actuation system moves both unison rings axially, concurrently and at the same rate of speed. In situations where gas loads on the nozzle flaps create overturning torsional loads on the inner unison ring the means described therein for tying the inner and outer rings together do not help resist these loads which would thus be transmitted into the actuation system. This may not be tolerable if the torsional loads are large enough. A lightweight system for tying these rings together in a manner which provides the necessary additional torsional stiffness is needed.

DISCLOSURE OF INVENTION

One object of the present invention is an improved convergent/divergent variable area nozzle.

Another object of the present invention is a dual unison ring construction for synchronizing the motion of the convergent and divergent portions of a convergent/divergent exhaust nozzle.

Yet another object of the present invention are dual unison rings for a convergent/divergent exhaust nozzle, which rings are actuated simultaneously using a single actuation system.

Accordingly, exhaust nozzle structure of a gas turbine engine having an axis is separately connected to axially translatable inner and outer radially aligned unison ring means, the inner and outer unison ring means being separated by engine case means and being interconnected by a plurality of radially extending, circumferentially spaced apart pins which pass through axially extending slots in the engine case means, the pins being fixed axially relative to both the inner and outer unison ring means but fixed radially relative to only one of the ring means to allow relative radial motion between the inner and outer ring means, wherein actuation means for axially translating the exhaust nozzle is connected to only one of the unison ring means, but translates both of the unison ring means simultaneously as a result of their being interconnected by said pins.

In a preferred embodiment the upstream ends of convergent nozzle flaps are pivotally connected to an axially translatable inner unison ring which is an annular box section. The upstream ends of divergent nozzle flaps are pivotally connected to the downstream ends of the convergent nozzle flaps. A plurality of connecting means disposed radially outwardly of the convergent and divergent nozzle flaps have their downstream ends pivotally connected to the divergent flaps and their upstream ends pivotally connected to an axially translatable outer unison ring disposed radially outwardly of and radially aligned with the inner unison ring. An engine case is disposed radially between the two rings. A plurality of radially extending, circumferentially spaced apart pins interconnect the rings and pass through axially extending slots in the engine case disposed between the rings. The pins are fixed axially relative to both said inner and outer rings but are free to move radially relative to one or the other of said rings to permit relative axial movement between the rings. Actuation means is connected to one of the rings and simultaneously translates both rings axially since the rings are interconnected by the pins. In addition to transmitting actuation forces between the rings, the pins also provide torsional stiffness to the rings to counteract gas pressure forces on the nozzle flaps.

The foregoing and other objects, features and advantages of the present invention will become more apparent in the light of the following detailed description of the preferred embodiment thereof as shown in the accompanying drawing.

BRIEF DESCRIPTION OF THE DRAWINGS

FIG. 2 is an enlarged view of a portion of FIG. 1 showing portions of the invention in greater detail.

FIG. 3 is a sectional view taken along the line 3—3 in FIG. 2.

FIG. 4 is a sectional view taken along the line 4—4 in FIG. 2.

BEST MODE FOR CARRYING OUT THE INVENTION

Figure 1:
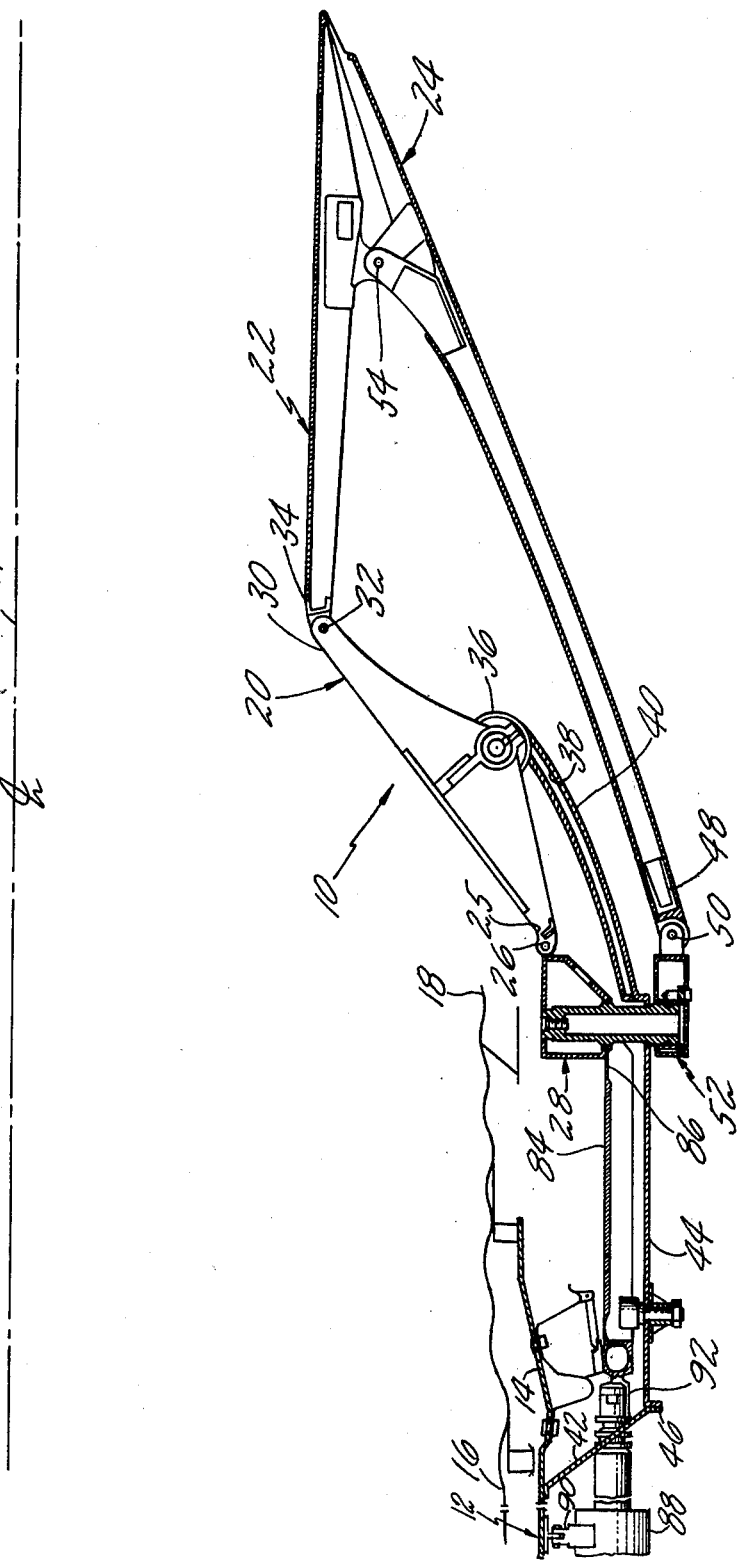
FIG. 1 is a simplified sectional view of a gas turbine engine exhaust nozzle incorporating the features of the present invention.

As an exemplary embodiment of the present invention consider the variable area convergent/divergent exhaust nozzle assembly generally represented by the numeral 10 of FIG. 1. The nozzle assembly 10 comprises engine fixed structure 12 includng an augmentor duct 14 having a duct liner 16 spaced radially inwardly therefrom defining the augmentor gas flow path having an axis 19, which is the engine axis. The fixed engine structure 12 may also include the engine nacelle, which is not shown. The duct liner 16 has a circular outlet end 18. Circumferentially disposed about the engine axis 19 are a plurality of upstream flaps 20 defining a convergent nozzle, a plurality of downstream flaps 22 defining a divergent nozzle, and a plurality of external flaps 24. Suitable sealing means, not shown, would be provided between circumferentially adjacent flaps to prevent gas leakage during operation. The upstream flaps 20 have their forward ends 25 pivotally connected, as at 26 to an inner unison ring 28 which is able to translate axially. The rearward ends 30 of the upstream flaps 20 are pivotally connected, as at 32, to the forward ends 34 of corresponding downstream flaps 22. Each upstream flap 20 has a cam follower attached to it. In the present embodiment the cam follower is a roller 36. The roller 36 rides along the surface 38 of a cam track 40 as the unison ring 28 translates. The cam track 40 is supported from the augmentor duct 14 through conical and cylindrical support cases 42, 44, respectively which are bolted together at a flanged joint 46. As the forward ends 25 of the flaps 20 translate downstream, the convergent nozzle exit area decreases; and as the forward ends 25 of the flaps 20 translate upstream, the exit area increases.

The forward ends 48 of the external flaps 24 are pivotally connected, as at 50, to an axially translatable outer unison ring 52 which is radially aligned and concentric with the inner unison ring 28. The inner and outer unison rings 28, 52 are interconnected by a plurality of circumferentially spaced apart radially extending pins 67 and translate axially in unison, as will be more fully explained hereinbelow. The case 44 is disposed between the unison rings 28, 52. The pivot point 50 is located radially outwardly of the pivot point 26. The external flap 24 and the downstream flap 22 are pivotally connected, as at 54, to each other at a point downstream of their respective forward ends 48, 34. In this nozzle assembly the exit area of the divergent nozzle defined by the flaps 22 increases as the exit area of the convergent nozzle defined by the flaps 20 increases, and vice versa. It will be apparent that, from the point of view of proper scheduling of the convergent and divergent nozzle portions of the assembly 10, the external flaps 24 could be rods or similar connecting means pivotally connected at their forward and rearward ends at the pivot points 50, 54, respectively. Flaps are preferred, however, in order to provide a smooth, aerodynamically efficient external contour for the nozzle assembly 10.

Referring to FIG. 2, which is an enlarged view of the unison ring area of FIG. 1, the inner unison ring 28 is seen to be a box section having inner and outer cylindrical walls 56, 58, respectively. A cylindrical connector 59 is attached at its downstream end 61 to the inner unison ring 28, such as by welding, and includes a plurality of circumferentially spaced apart axially extending inner guide tracks 63, best shown in FIG. 4. Seal means 65 attached to the exhaust duct 14 abuts the inner cylindrical surface of the connector 59 and prevents exhaust gas leakage. The type of seal shown is fully described in commonly owned U.S. Pat. No. 3,354,649, incorporated herein by reference.

The outer unison ring 52 is also a box section having inner and outer cylindrical walls 60, 62, respectively. The outer wall 58 of the inner ring 28 has a plurality of circumferentially spaced apart circular openings 64 therethrough; and the inner wall 60 of the outer unison ring 52 has a similar number of circular openings 66 therethrough, one each being radially aligned with an opening 64. A plurality of radially extending circumferentially spaced apart pins 67 interconnect the inner and outer unison rings 28, 52. Each pin passes through a pair of the radially aligned openings 64, 66 and extends across substantially the full radial height of each unison ring. Each pin 67 also passes through an axially elongated slot 69 (see FIG. 3) in the case 44.

In this embodiment the inner end 68 of each pin 67 is fixedly secured, as by a bolt 70, to the inner wall 56 of the inner unison ring 28. The pins 67 also fit closely within the openings 64 in the outer wall 58, thereby providing stiffness to the ring 28. The portion of each pin 67 extending into the outer unison ring 52 is slidably disposed within a bushing 72. The outer wall 62 includes a plurality of circumferentially spaced apart openings 74, one being aligned with each of the openings 66, for permitting insertion of the bushings 72 and pins 67 into the unison rings 52, 28, during assembly. After inserting the pins 67, cover plates 76 are disposed over the openings 64 and, together with the bushings 72, are fixedly secured to the outer wall 62 by suitable means such as bolts 78. The length of the pins 67 is selected such that there is a small gap 80 between the outer end 82 of each pin 67 and its corresponding cover plate 76. The sliding fit between the pins 67 and bushings 72 allows relative radial motion between the inner and outer unison rings, such as is likely to occur during operation due to the different thermal growth rates of the unison rings.

Figure 5:
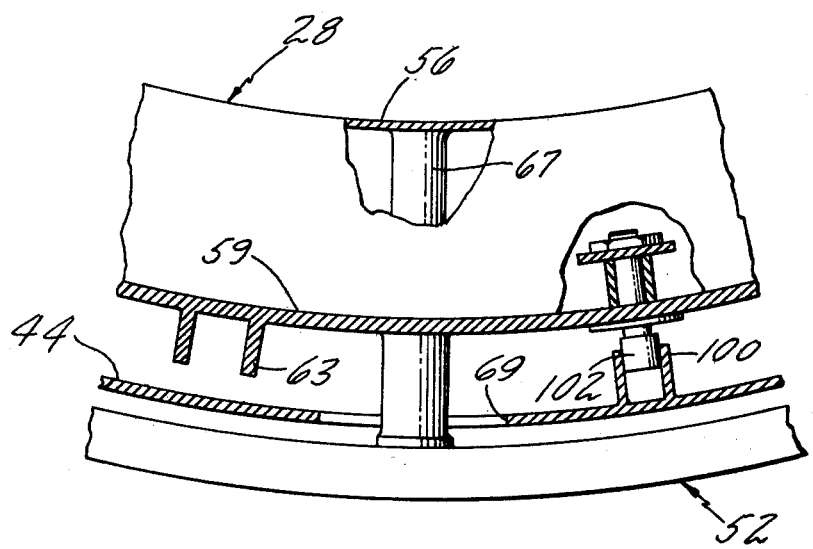
FIG. 5 is a sectional view, partly broken away, taken along the line 5—5 in FIG. 2.

A plurality of hydraulic actuators 88 are circumferentially spaced apart about the augmentor duct 14 and are secured thereto just upstream of the conical support case 42, as at 90. The push rod 92 of each actuator 88 is pinned to the upstream end 94 of the cylindrical connector 59. Engaging each guide track 63 is a roller 98 fixed axially to the case 44. A plurality of axially extending outer guide tracks 100 are secured to the inside of the case 44 and are shown in phantom in FIG. 2 since they are out of the plane of the guide tracks 63. The guide tracks 100 are best shown in FIGS. 4 and 5. With reference to FIG. 5, a roller 102 engages each track 100. The rollers 102 are carried by and fixed axially relative to the inner unison ring 28. The rollers 98, 102 and their associated tracks 63, 100, respectively, guide and radially position the inner unison ring 28 as it is pulled or pushed axially by the actuators 88 during actuation of the exhaust nozzle assembly 10.

It is apparent from the drawing that gas loads on the nozzle flaps can create substantial overturning or torsional loads on the inner unison ring, such torsional loads being represented by the arrow 200 in FIG. 2. Even a small rotational (overturning) movement of the unison ring 28 would, without the present invention create a very large radial force on the ends of the actuators due to the large moment arm provided by the connector 59. The pins 67 of the present invention and the manner in which they interconnect the inner and outer unison rings provide the torsional stiffness necessary to resist the torsional loads. At the same time the pins still allow differential thermal growth between the rings and ensure concurrent axial motion, as if the inner and outer unison rings were a unitary structure. All this is accomplished with a simple, lightweight construction using an activation system for only one of the unison rings, even though the inner and outer rings are separated by an engine case.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. In a gas turbine engine having an axis and comprising engine fixed structure and a convergent/divergent exhaust nozzle assembly supported from said structure, said structure including case means, the improved nozzle assembly comprising:

unison ring means including an inner annular box section disposed around the engine axis and an outer annular box section disposed around the engine axis radially outwardly of said inner box section and radially aligned therewith, said case means being disposed between said inner and outer box sections and having a plurality of circumferentially spaced apart axially extending slots therethrough;

said unison ring means further including a plurality of circumferentially spaced apart radially extending pins each having an inner and outer end, each pin extending into one of said box sections and across the radial height thereof and being fixed relative thereto, said pins extending radially through one of said slots in said case means into and across the radial height of said other one of said box sections and being fixed axially relative to said other one of said box sections and movable radially relative thereto, said pins providing torsional stiffness to said unison ring means;

an axially translatable variable area convergent nozzle comprising a plurality of rotatable and translatable first flaps having upstream ends pivotally connected to said inner box section;

an axially translatable variable area divergent nozzle downstream of said convergent nozzle and including a plurality of second flaps pivotally connected to said first flaps;

connecting means having downstream ends pivotally connected to said second flaps and upstream ends pivotally connected to said outer box section; and actuation means connected to said unison ring means for translating one of said box sections in an axial direction, wherein said other one of said box sections is translated axially simultaneously, said translating force being transmitted to said other one of said box sections through said pins.

2. The improved nozzle assembly according to claim 1 wherein said inner box section includes a radially inner wall and a radially outer wall, each of said pins passing through said radially outer wall and axially engaging said outer wall to prevent relative axial movement of said pin and outer wall, said inner end of said pin being fixedly secured to said radially inner wall, a plurality of bushing means fixedly disposed within said outer box section, one of said bushing means corresponding to each of said pins, said outer ends of each of said pins extending into a corresponding one of said bushing means and radially slidable therewithin and axially fixed relative thereto.

3. The improved nozzle assembly according to claim 2 wherein said case means includes nozzle track means secured thereto downstream of said unison ring means, follower means attached to each of said first flaps and in contact with said track means, said track means radially supporting said first flaps through said follower means and determining the angular position of each of said first flaps as said unison ring means is translated axially.

4. The improved nozzle assembly according to claim 3 wherein said unison ring means includes connector means secured to and extending axially upstream of said one of said box sections, said connector means including an upstream end, said actuation means being attached to said upstream end of said connector means.

5. The improved nozzle assembly according to claim 4 wherein said connector means is a cylinder, a plurality of circumferentially spaced apart axially extending first guide means fixed to said cylinder, first axially stationary roller means attached to said engine structure and engaging said first guide means during translation of said unison ring means, a plurality of circumferentially spaced apart, axially extending second guide means fixed to said engine structure, second roller means attached to said other one of said box sections and engaging said second guide means during translation of said unison ring means.

* * * * *

UNITED STATES PATENT AND TRADEMARK OFFICE
CERTIFICATE OF CORRECTION

PATENT NO. : 4,456,178
DATED : June 26, 1984
INVENTOR(S) : Dennis C. Jones and James F. Marshall It is certified that error appears in the above-identified patent and that said Letters Patent is hereby corrected as shown below:

Column 1, lines 30-31 delete "and copending as of January 20, 1984."

Signed and Sealed this

*Twenty-ninth* Day of *January 1985*

[SEAL]

*Attest:*

DONALD J. QUIGG

*Attesting Officer*  *Acting Commissioner of Patents and Trademarks*